United States Patent
Bhalerao et al.

(10) Patent No.: US 11,598,515 B2
(45) Date of Patent: Mar. 7, 2023

(54) ANGLE AIMING MECHANISM FOR APPROACH LIGHT

(71) Applicant: Eaton Intelligent Power Limited, Dublin (IE)

(72) Inventors: Eshant Chandrakant Bhalerao, Buldhana (IN); Mohan Suklal Ahire, Pune (IN); Tobias Trudeau, Monson, MA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/649,685

(22) Filed: Feb. 2, 2022

(65) Prior Publication Data

US 2022/0243904 A1 Aug. 4, 2022

Related U.S. Application Data

(60) Provisional application No. 63/145,177, filed on Feb. 3, 2021.

(51) Int. Cl.
| | | |
|---|---|---|
| *F21V 21/30* | (2006.01) | |
| *F21W 111/06* | (2006.01) | |
| *B64F 1/20* | (2006.01) | |
| *B60Q 1/068* | (2006.01) | |

(52) U.S. Cl.
CPC ............ *F21V 21/30* (2013.01); *B60Q 1/0683* (2013.01); *B64F 1/20* (2013.01); *F21W 2111/06* (2013.01)

(58) Field of Classification Search
CPC .............................. F21V 21/30; B60Q 1/0683
See application file for complete search history.

(56) References Cited

U.S. PATENT DOCUMENTS

| | | | | |
|---|---|---|---|---|
| 6,461,009 | B2* | 10/2002 | Smith ................. | B60Q 1/2611 362/35 |
| 2001/0012205 | A1* | 8/2001 | Lassovsky ............... | F21V 7/24 362/322 |
| 2011/0286228 | A1* | 11/2011 | Zanma ................. | F21S 41/675 362/516 |
| 2014/0204218 | A1* | 7/2014 | Gebhard ................ | F21V 21/26 362/372 |
| 2016/0137122 | A1* | 5/2016 | Oshima ................ | F21S 41/635 362/512 |
| 2020/0116339 | A1 | 4/2020 | Mizobe | |

FOREIGN PATENT DOCUMENTS

| | | |
|---|---|---|
| CN | 110949686 A | 4/2020 |
| EP | 1923623 A2 | 5/2008 |
| WO | 2010027913 A1 | 3/2010 |
| WO | 2015155106 A1 | 10/2015 |

OTHER PUBLICATIONS

Extended European Search Report and Opinion for related European Patent Application No. 22154069.3, dated Jul. 15, 2022.

\* cited by examiner

*Primary Examiner* — William N Harris
(74) *Attorney, Agent, or Firm* — Pearne & Gordon LLP

(57) ABSTRACT

An angle aiming mechanism for a light assembly. The angle aiming mechanism including a body, a gear rotational coupled to the light assembly and an angle adjuster movable between a first position and a second position. The angle adjuster engaging the gear when the angle adjuster is in the first position. The angle adjuster disengaging the gear when the angle adjuster is in the second position. The angle adjuster configured such that rotation of the angle adjuster in the first position changes an angle of the light assembly relative to a reference plane.

16 Claims, 11 Drawing Sheets

ANGLE AIMING MECHANISM FOR APPROACH LIGHT

FIELD OF THE INVENTION

The present invention relates to an aiming mechanism for a light assembly, and more particularly, to an angle aiming mechanism for an approach light.

BACKGROUND OF THE INVENTION

Light systems may be placed proximate runways to aid pilots in properly positioning an aircraft for landing at an airport. In particular, a combination of lights from precision approach path indicators (PAPI) to approach and threshold lights aid the pilot in visually identifying the runway and aligning the aircraft with the runway. The operation requirements of the airfield will dictate the sophistication and configuration of the lighting system for the runway.

Known approach lights include a complex arrangement of screws and locknuts that are used to position the approach light at a desired angle. However, this known arrangement tends to be difficult to use and requires an excessive amount of time for the user to position the approach light. In addition, it is often difficult for the screws and locknuts to maintain the approach light at the desired angle for an extended period of time.

It is desirable to have a mechanism that can allow a user to quickly and easily adjust a light to the proper angle and that maintains the light at the desired angle without the need for further adjustment.

SUMMARY OF THE INVENTION

There is provided an angle aiming mechanism for a light assembly. The angle aiming mechanism including a body, a gear rotational coupled to the light assembly and an angle adjuster movable between a first position and a second position. The angle adjuster engaging the gear when the angle adjuster is in the first position. The angle adjuster disengaging the gear when the angle adjuster is in the second position. The angle adjuster configured such that rotation of the angle adjuster in the first position changes an angle of the light assembly relative to a reference plane.

In the angle aiming mechanism, a spring may be provided for biasing the angle adjuster into the first position.

In the angle aiming mechanism, the spring may be a curved spring or a flat spring.

In the angle aiming mechanism, the first position may correspond to the angle adjuster being in an upper position relative to the body and the second position may correspond to the angle adjuster being in a lower position relative to the body.

In the angle aiming mechanism, the gear may be a spur gear and the angle adjuster may include a worm gear configured to engage the spur gear when the angle adjuster is in the first position.

In the angle aiming mechanism, a knob may be attached to a distal end of the angle adjuster for allowing a user to rotate the angle adjuster.

In the angle aiming mechanism, a key may rotationally couple the gear to the light assembly.

In the angle aiming mechanism, a first set screw may rotationally couple the gear to a main shaft and a second set screw may rotational couple the main shaft to a hub that is attached to the light assembly.

In the angle aiming mechanism, a main shaft may define a rotational axis of the light assembly and the gear may be attached to the main shaft.

In the angle aiming mechanism, a nut on the main shaft may be provided for fixing the light assembly at the angle.

In the angle aiming mechanism, a longitudinal axis of the main shaft may be orthogonal to a longitudinal axis of the angle adjuster.

In the angle aiming mechanism, the angle adjuster may be configured to pivot relative to the body when moving between the first position and the second position.

In the angle aiming mechanism, a swivel bearing may be attached to a distal end of the angle adjuster for allowing the angle adjuster to pivot between the first position and the second position.

DETAILED DESCRIPTION OF PREFERRED EMBODIMENTS

Figure 1:
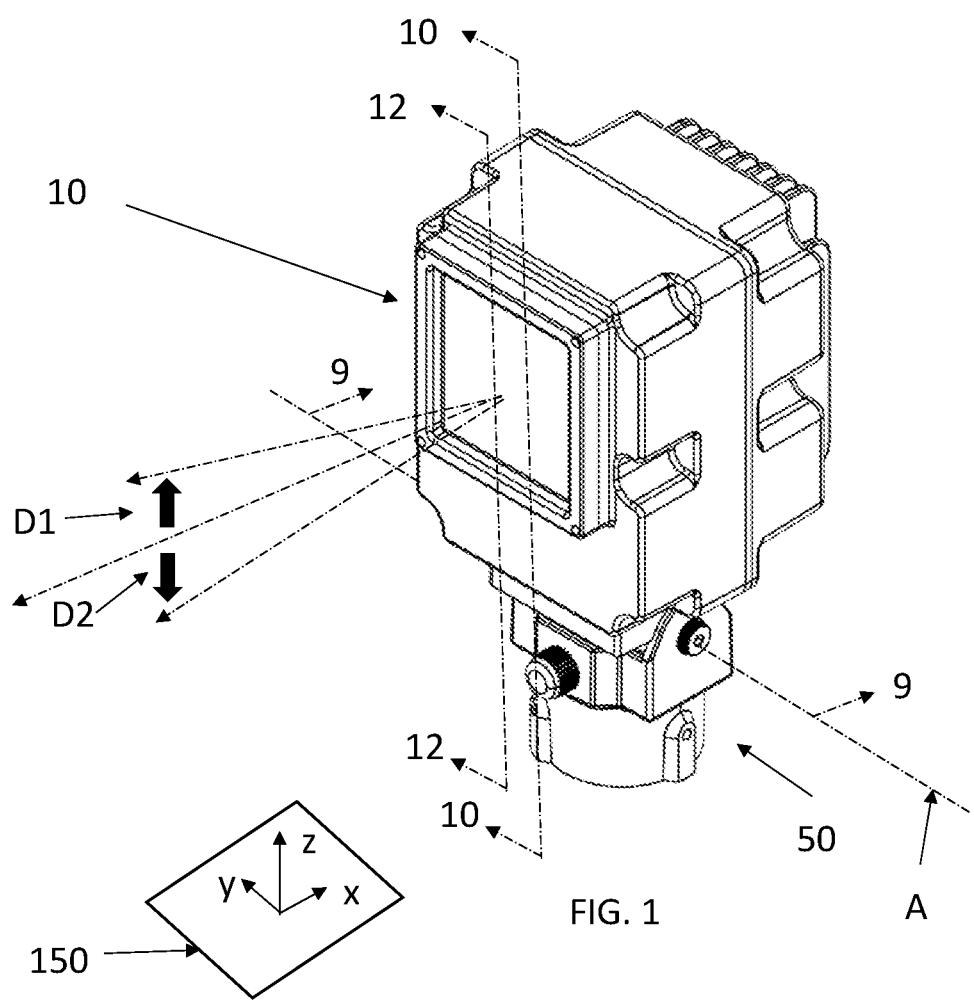
FIG. 1 is a front, perspective view of a light assembly with an angle aiming mechanism attached to a lower portion of the light assembly, according to an embodiment of the present invention.

Referring now to the drawings, FIG. 1 shows a front perspective view of a light assembly 10 attached to an angle aiming mechanism 50. Although FIG. 1 illustrates the light assembly 10 as an approach light, the angle aiming mechanism 50 may be used with other lights wherein it is desirable to adjust and fix the angular position of the light relative to a reference plane. FIG. 1 also illustrates the angle aiming mechanism attached to a lower part of the light assembly 10. It is contemplated that the angle aiming mechanism 50 may be attached to any other portion of the light assembly 10 so long as the angle aiming mechanism 50 can be used to adjust the angle of the light assembly 10 relative to a reference plane.

Figure 2:
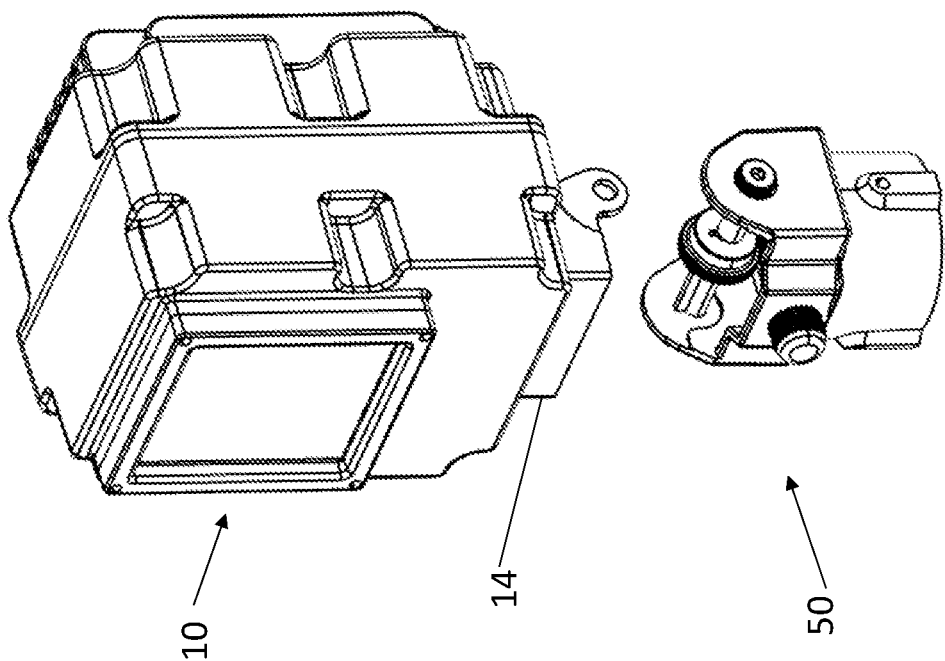
FIG. 2 is an exploded perspective view of the light assembly and the angle aiming mechanism of FIG. 1.

Referring to FIG. 2, an exploded view of the light assembly 10 and the angle aiming mechanism 50 is provided. The angle aiming mechanism 50 is illustrated detached from the light assembly 10.

Figure 3:
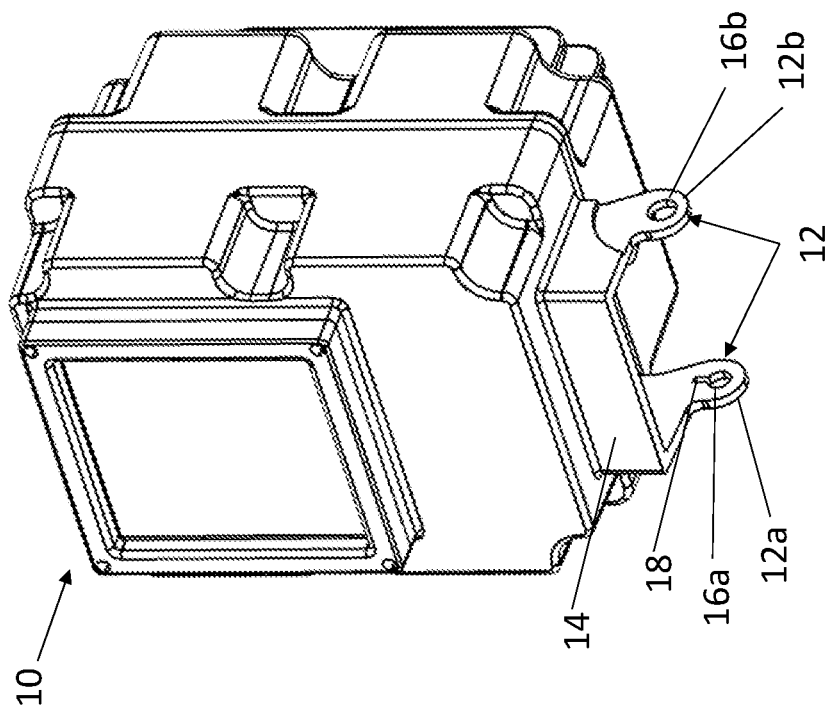
FIG. 3 is a bottom perspective view of the light assembly of FIG. 1.

Referring to FIG. 3, a bottom perspective view of the light assembly 10 is provided. The light assembly 10 includes a pair of spaced-apart mounting legs 12 that extend from a bottom of a housing 14 of the light assembly 10. Holes 16*a*, 16*b* extend through each leg 12, respectively. A keyway 18 is formed on a periphery of the hole 16*a*. The keyway 18 is dimensioned and positioned as described in detail below. In the embodiment shown, a distal end 12*a*, 12*b* of each leg 12 is contoured to be curved.

Figure 5:
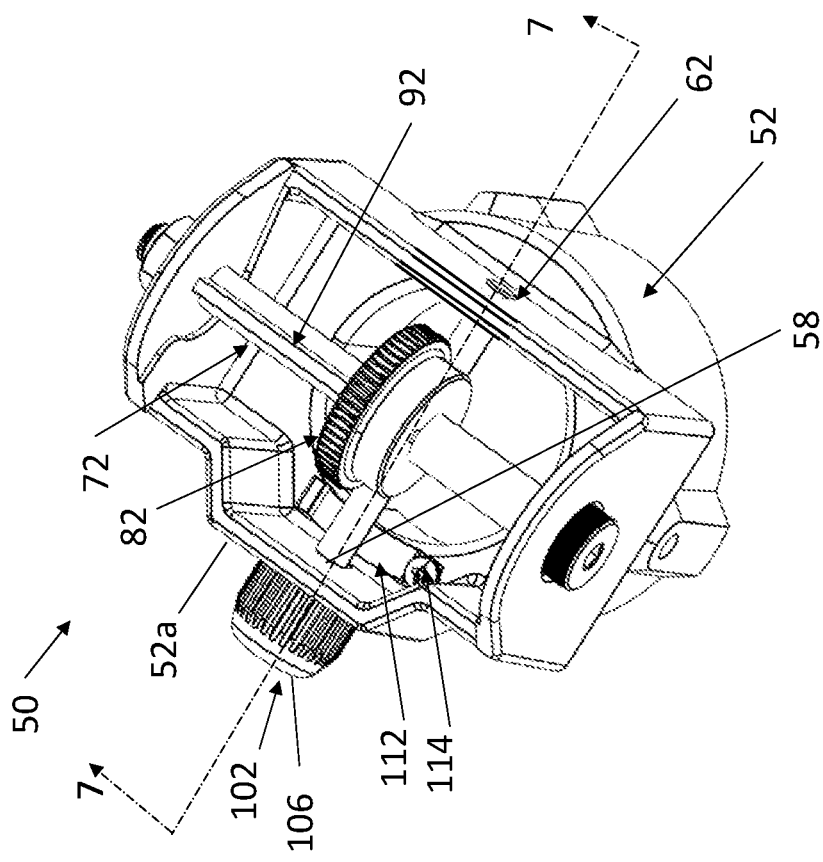
FIG. 5 is a rear, top perspective view of the angle aiming mechanism of FIG. 1.
Figure 4:
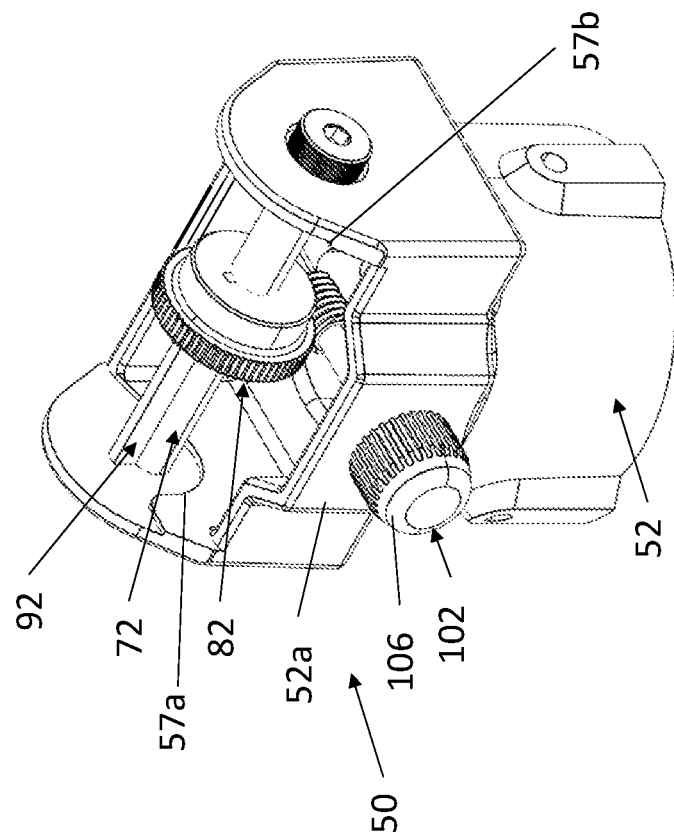
FIG. 4 is a front, top perspective view of the angle aiming mechanism of FIG. 1.

Referring to FIGS. 4 and 5, the angle aiming mechanism 50 is shown and includes, in general, a housing 52, a main shaft 72, a spur gear 82, a key 92, an angle adjuster 102 and a spring 112 (FIG. 5).

Figure 7A:
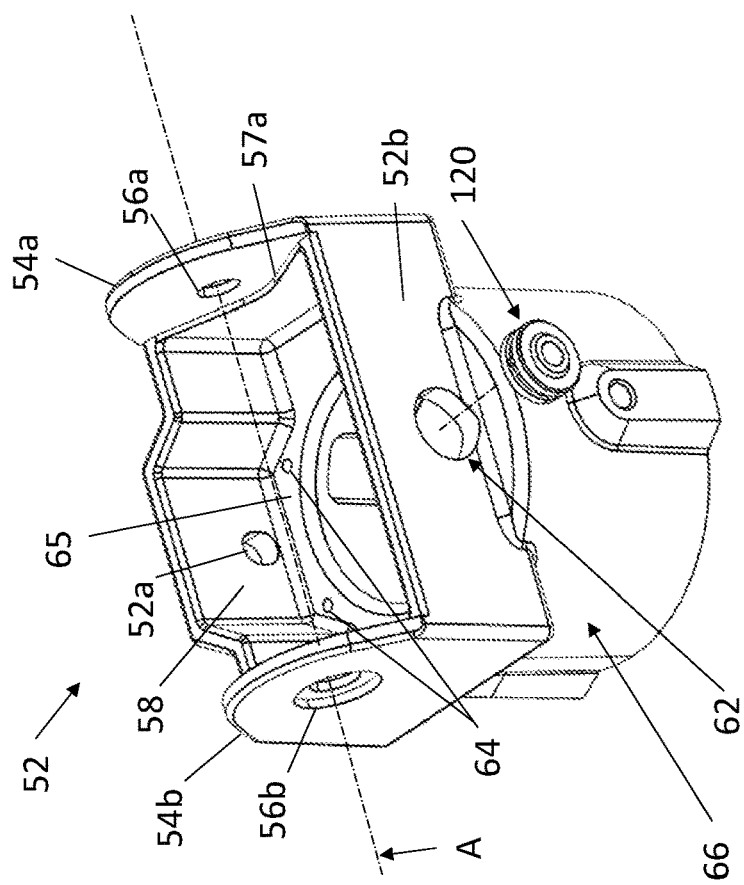
FIG. 7A is a rear perspective view of the housing of FIG. 6.
Figure 6:
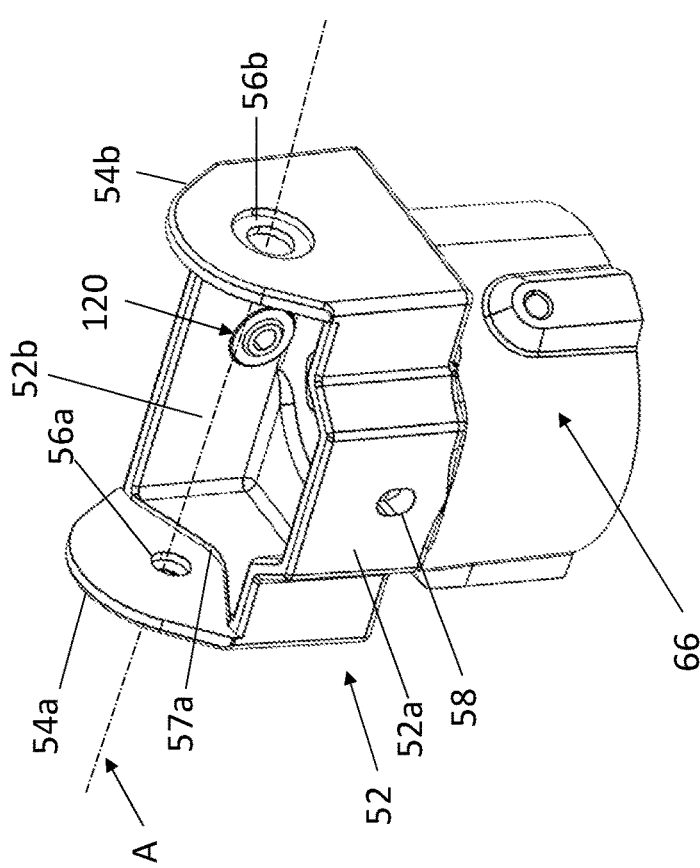
FIG. 6 is a front perspective view of a housing of the angle aiming mechanism of FIG. 4.
Figure 7B:
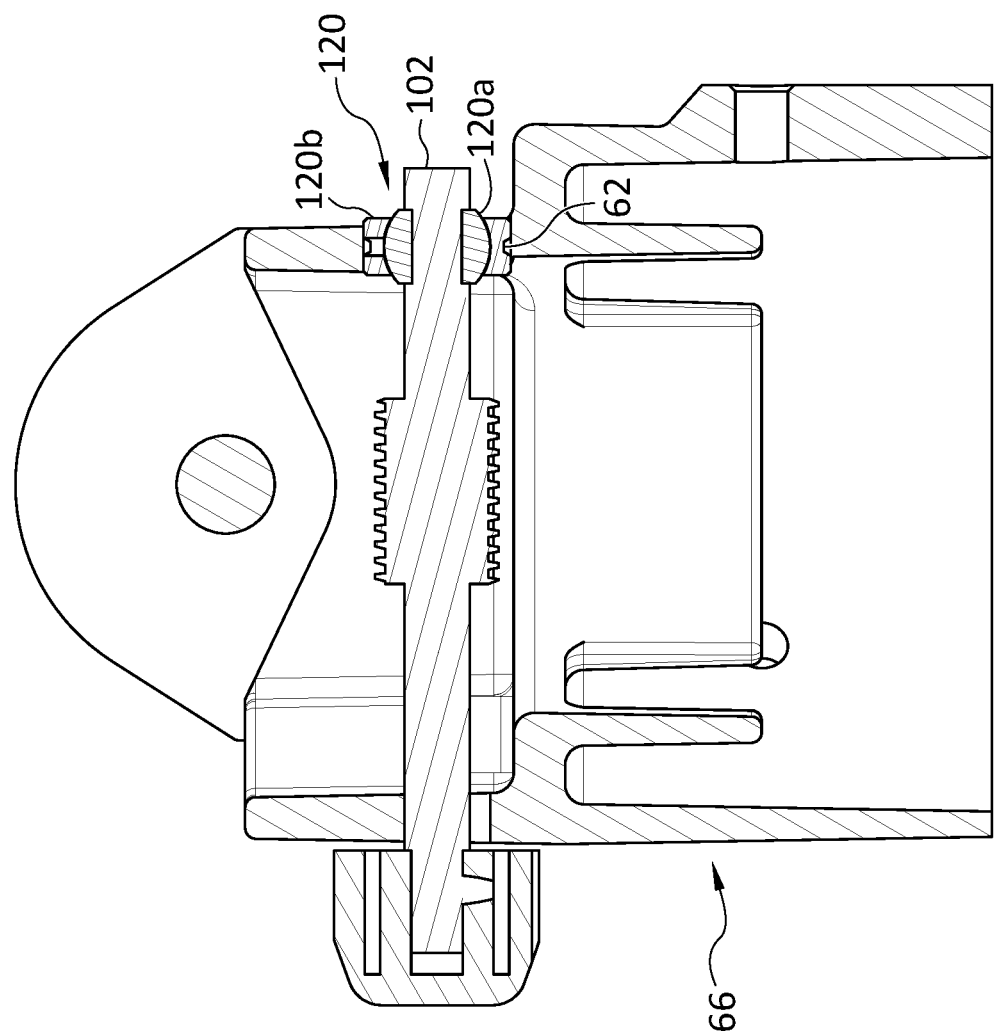
FIG. 7B is a section view taken along line 7-7 of FIG. 5.

Referring to FIGS. 6, 7A and 7B, the housing 52 is shown. The housing 52 includes a pair of spaced-apart supports 54*a*, 54*b* on opposite sides of the housing 52. A hole 56*a*, 56*b* extends through each support, respectively. The holes 56*a*, 56*b* are aligned and define a pivot axis A of the angle aiming mechanism 50, as described in detail below. In the embodiment illustrated, an inner surface of the supports 54*a*, 54*b* is recessed to define a contoured ledge 57*a*, 57*b* (FIG. 4), respectively. The contoured ledges 57*a*, 57*b* (FIG. 4) are dimensioned as described in detail below.

An elongated opening 58 extends through a front wall 52*a* of the housing 52. The elongated opening 58 is oriented such that it extends in the vertical direction. An opening 62 is formed in a rear wall 52*b* of the housing 52. The opening 62 is dimensioned to receive a swivel bearing 120. Referring to FIG. 7B, the swivel bearing 120 includes an inner bearing 120*a* that is dimensioned and configured to swivel within a housing 120*b* of the swivel bearing 120. An inner opening of the inner bearing 120*a* is dimensioned to engage an angle adjuster 102, as described in detail below. An outer cylindrical circumference of the housing 120*b* is dimensioned to be received into the opening 62 to secure the swivel bearing 120 within the opening 62. The elongated opening 58 and the opening 62 are positioned and dimensioned as described in detail below. Referring to FIG. 7A, mounting holes 64 extend into a shelf 65 located adjacent a rear surface of the front wall 52*a*. The mounting holes 64 are dimensioned and positioned as described in detail below.

In the embodiment illustrated, the housing 52 includes a lower body portion 66 for securing the housing 52 to a base (not shown). It is contemplated that the lower body portion 66 may include any number of mounting elements, for example, but not limited to, slots, bolts, tabs, etc. for securing the housing 52 to the base (not shown).

Figure 8:
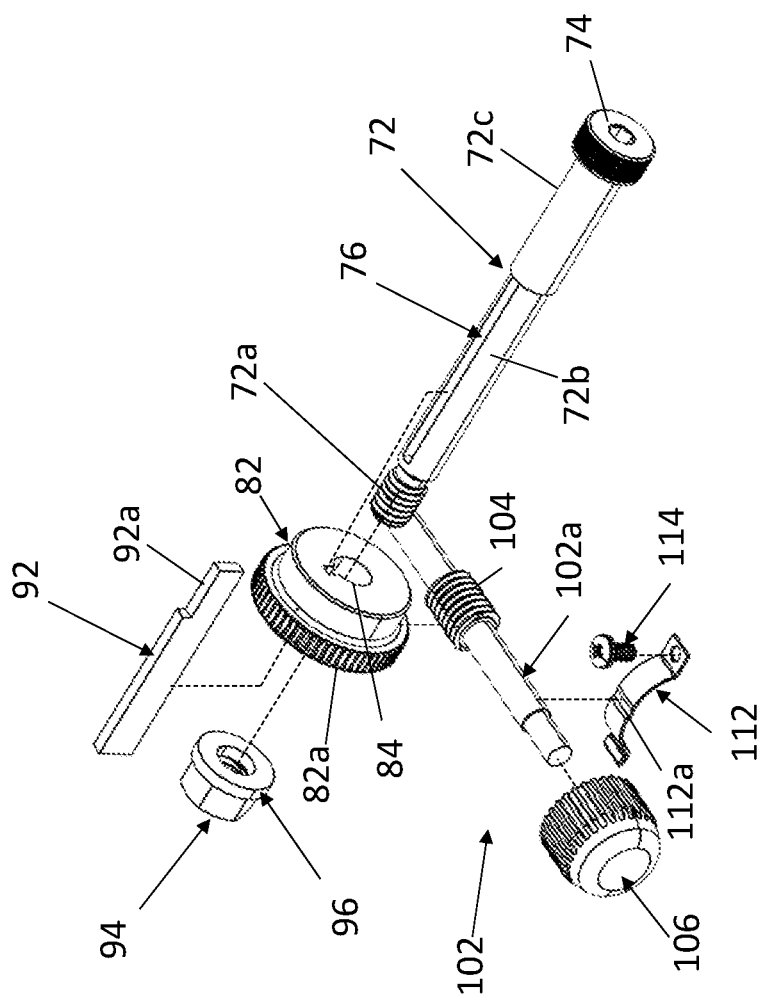
FIG. 8 is an exploded perspective view of various internal components of the angle aiming mechanism of FIG. 4.

Referring to FIG. 8, the main shaft 72 includes threaded end 72*a*, a body portion 72*b* and a shoulder portion 72*c*. The shoulder portion 72*c* extends between the body portion 72*b* and a head 74 of the main shaft 72. A keyway slot 76 is formed in the body portion 72*b* and extends axially along the main shaft 72.

The spur gear 82 is dimensioned to be positioned on the main shaft. The spur gear 82 includes a plurality of teeth 82*a*. A keyed opening 84 extends through the spur gear 82 and is dimensioned to receive the main shaft 72 therein.

The key 92 is an elongated element that is dimensioned to be received into the keyway slot 76 of the main shaft 72 and the keyed opening 84 of the spur gear 82. In this respect, the key 92 is configured to couple the spur gear 82 to the main shaft 72 such that spur gear 82 and the main shaft 72 rotate together. The key 92 includes a stepped portion 92*a* at one end that is dimensioned as described in detail below.

A nut 94 and washer 96 may be provided for attaching to the threaded end 72*a* of the main shaft 72. In the embodiment illustrated, the washer 96 is a lock washer.

The angle adjuster 102 is dimensioned to engage the spur gear 82. The angle adjuster 102 includes a rod portion 102*a* having a worm gear 104 formed on a portion of the outer surface of the rod portion 102*a*. The worm gear 104 is dimensioned and configured to engage the teeth 82*a* of the spur gear 82, as explained in detail below. A knob 106 is dimensioned to be fixed to a distal end of the rod portion 102*a* of the angle adjuster 102 for causing the worm gear 104 to rotate as the knob 106 is rotated.

The spring 112 is illustrated as a curved spring that is secured to the housing 52 (FIG. 6) via a screw 114. It is contemplated that the spring 112 may be a flat spring. In the embodiment illustrated, the spring 112 includes a detent 112*a* that is positioned and configured to receive the rod portion 102*a* of the angle adjuster 102. It is contemplated that the spring 112 may have other configurations so long as the spring 112 biases the angle adjuster 102 into an upper position in the elongated opening 58, as described in detail above. For example, the spring 112 may be a compression spring that biases the angle adjuster 102 in an upward direction.

The angle aiming mechanism 50 will now be described with relation to assembling the angle aiming mechanism 50 to the light assembly 10. Referring to FIGS. 4 and 5, as an initial step, the spring 112 may be secured to the housing 52 using the screw 114. As illustrated in FIG. 5, the screw 114 and the spring 112 are positioned such that the spring 112 is disposed below the elongated opening 58 in the front wall 52*a*.

Thereafter, the angle adjuster 102 is inserted through the elongated opening 58 and the opening 62 such that the knob 106 is positioned outside of the front wall 52*a* of the housing 52 and a distal end of the angle adjuster 102 is in the swivel bearing (FIG. 7B). The angle adjuster 102 is also positioned to rest on the spring 112. In this respect, the spring 112 biases the knob 106 towards an upper end of the elongated opening 58 (see, FIG. 10).

Figure 9:
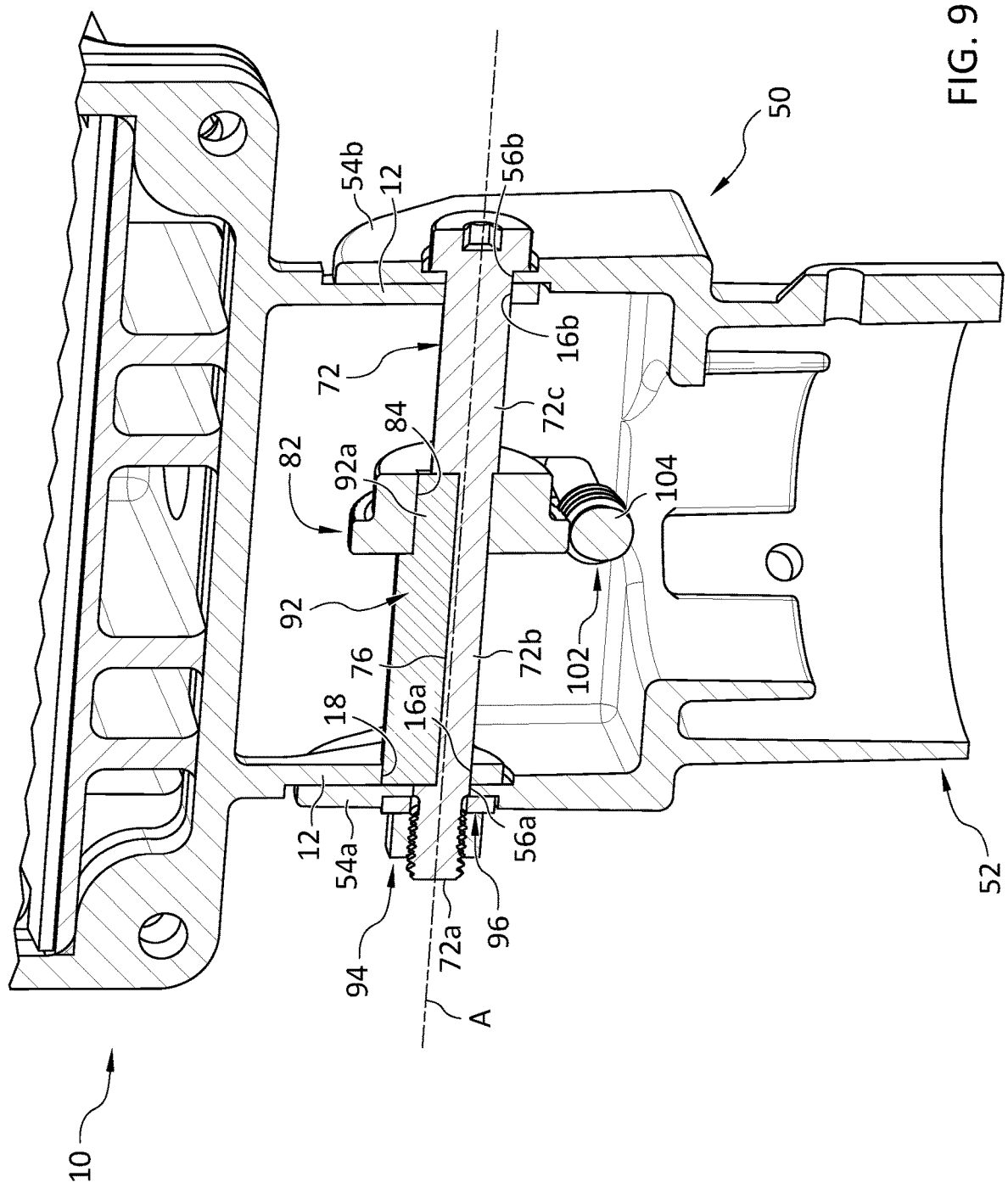
FIG. 9 is a section view taken along line 9-9 of FIG. 1.

Referring now to FIG. 9, the light assembly 10 is positioned on the housing 52 of the angle aiming mechanism 50 such that holes 16*a*, 16*b* in the mounting legs 12 align with the holes 56*a*, 56*b* of the housing 52, respectively. In this respect, the holes 16*a*, 16*b* align with the pivot axis A of the angle aiming mechanism 50. The contoured ledges 57*a*, 57*b* (FIG. 4) may be shaped to allow the distal ends 12*a*, 12*b* (FIG. 3) of the legs 12 to be received into the housing 52. The contoured ledges 57*a*, 57*b* (FIG. 4) may aid in the assembly of the light assembly 10 to the housing 52 by defining a "pocket" on the inner walls of the supports 54*a*, 54*b* that helps to properly locate the light assembly 10 in the housing 52.

The main shaft 72 is inserted through the hole 56*b* of the housing 52 and hole 16*b* of the mounting leg 12. Before the threaded end 72*a* of the main shaft 72 exits the holes 16*a*, 56*a* on the opposite side of the light assembly 10 and the housing 52, respectively, the spur gear 82 is slid onto the main shaft 72. In particular, the spur gear 82 is positioned on the body portion 72*b* and abuts the shoulder portion 72*c*. Thereafter, the key 92 is positioned such that the stepped portion 92*a* of the key 92 is inserted into the keyed opening 84 and the remaining portion of the key 92 is inserted into the keyway slot 76 on the main shaft 72. As illustrated in FIG. 9, the spur gear 82 is axially fixed on the main shaft 72 between the shoulder portion 72c of the main shaft 72 and a stepped formed by the stepped portion 92a of the key 92.

The threaded end 72a of the main shaft 72 is then inserted through the hole 16a in the leg 12 and then through the hole 56a of the housing 52. As the main shaft 72 is inserted through the hole 16a in the leg 12, the key 92 engages the keyway 18 in the leg 12 such that the light assembly 10 is rotationally coupled to the main shaft 72. In this respect, rotation of the main shaft 72 causes rotation of the light assembly 10, and vice versa.

Once the threaded end 72a exits the hole 56a of the housing 52, the nut 94 and washer 96 are placed on the main shaft 72. The nut 94 may be tightened to a sufficient torque to create a desired amount of friction when the light assembly 10 rotates or pivots relative to the angle aiming mechanism 50. As illustrated in FIG. 9, when the main shaft 72 is completely assembled, the spur gear 82 also engages the worm gear 104 on the angle adjuster 102. Referring back to FIG. 8, the main shaft 72 is oriented in the housing 52 such that a longitudinal axis of the main shaft 72 is orthogonal to a longitudinal axis of the angle adjuster 102.

Figure 10:
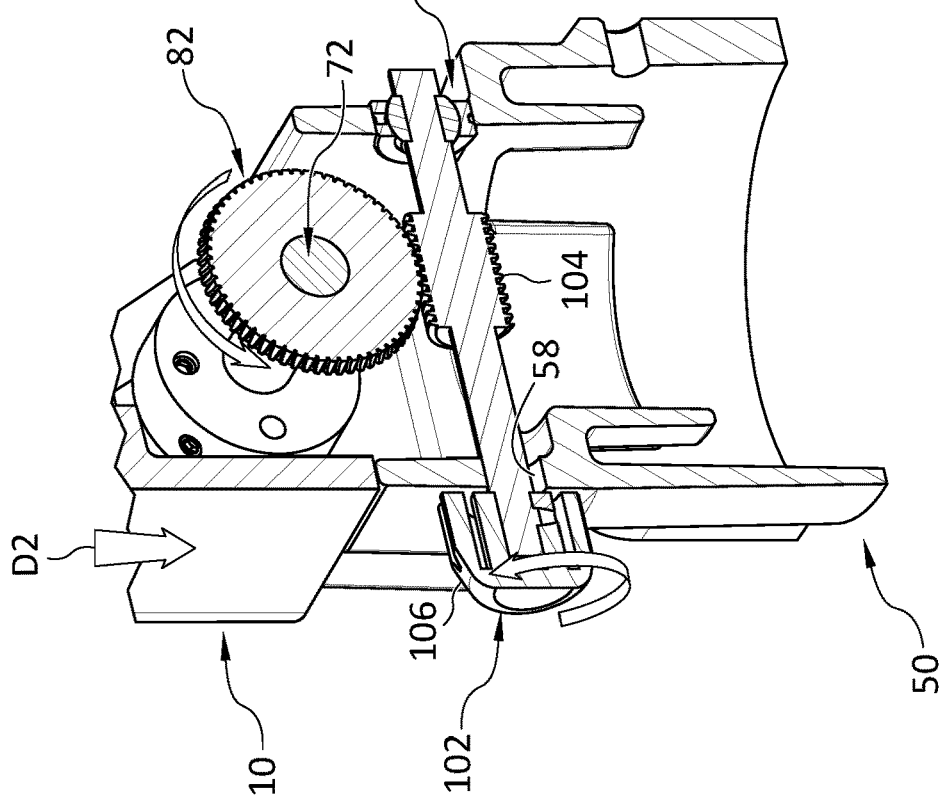
FIG. 10 is a section view taken along line 10-10 of FIG. 1 illustrating an angle adjuster of the angle aiming mechanism in a first position.

Referring to FIG. 10, after assembly, the angle adjuster 102 is biased to the upper position of the elongated opening 58. As such, rotation of the angle adjuster 102 causes the worm gear 104 to rotate which, in turn, causes the spur gear 82, the main shaft 72 and light assembly 10 to rotate or pivot. Referring to FIGS. 1 and 10, in the embodiment illustrated, when the angle adjuster 102 rotates in the counter-clockwise direction (when viewed from the knob 106), the worm gear 104 causes the spur gear 82 to rotate in the counter-clockwise direction (when viewed from the head 74 of the main shaft 72) and an angle of the light assembly 10 relative to a reference plane 150 to decrease, i.e., the light assembly 10 pivots in the direction D2 about the pivot axis A. In the embodiment illustrated, the reference plane 150 is a horizontal plane that the angle aiming mechanism 50 rests on. Similarly, when the angle adjuster 102 rotates in the clockwise direction, the spur gear 82 rotates in the opposite direction and the angle of the light assembly 10 relative to the reference plane 150 increases, i.e., the light assembly 10 pivots in the direction D1 about the pivot axis A. It is contemplated that opposite pivoting of the light assembly 10 relative to the rotation of the angle adjuster 102 may be achieved by making the teeth of the worm gear 104 to have a pitch that is opposite to that illustrated in the drawings. As described above, rotation of the angle adjuster 102 allows a user to make minor adjustments to the angle of the light assembly 10 by rotating a single device, i.e., the angle adjuster 102.

In the embodiment illustrated in FIG. 1, the longitudinal axis of the angle adjuster 102 aligns with a coordinate x-axis and the pivot axis A of the angle aiming mechanism 50 aligns with a coordinate y-axis. In other words, the longitudinal axis of the angle adjuster 102 is orthogonal to the pivot axis A. Accordingly, rotation of the angle adjuster 102 about the x-axis causes the light assembly 10 to pivot about the y-axis. The x-axis and the y-axis define the reference plane 150 and pivoting of the light assembly 10 about the y-axis causes the angle of the light assembly 10 relative to the reference plane 150 to increase/decrease based on the direction that the angle adjuster 102 rotates. It is contemplated that pivoting of the light assembly 10 with respect to another plane (e.g., the y-z plane) can be achieved by aligning the longitudinal axis of the angle adjuster 102 and the pivot axis A with orthogonal axes that define that plane (e.g., the y-axis and the z-axis). In this respect, the angle aiming mechanism 50 can be used to adjust the angle of the light assembly 10 relative to any reference plane.

Figure 11:
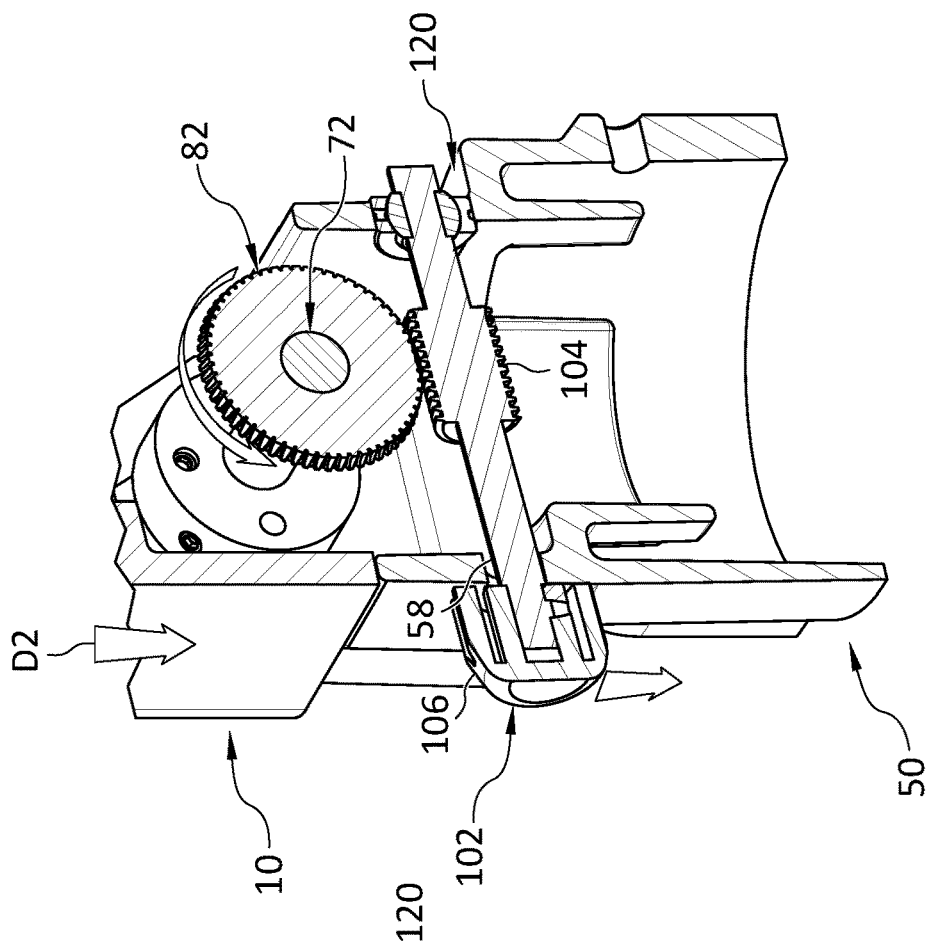
FIG. 11 is a section view taken along line 10-10 of FIG. 1 illustrating an angle adjuster of the angle aiming mechanism in a second position.

Referring to FIG. 11, to make major adjustments to the angle of the light assembly 10, the user moves the knob 106 downwardly relative to the elongated opening 58 against the spring force of the spring 112 (FIG. 5) to move the worm gear 104 out of engagement with the spur gear 82. In other words, the angle adjuster 102 is pivoted view the swivel bearing 120 from a first, upper position in the elongated opening 58 to a second, lower position. Once the worm gear 104 disengages the spur gear 82, the user may make large adjustments to the angle of the light assembly 10. Once the light assembly 10 is near the desired angle, the user may release the angle adjuster 102 and allow the worm gear 104 to re-engage the spur gear 82. At this time, the user may make minor adjustments to the angle of the light assembly 10 in the manner described above.

Figure 12:
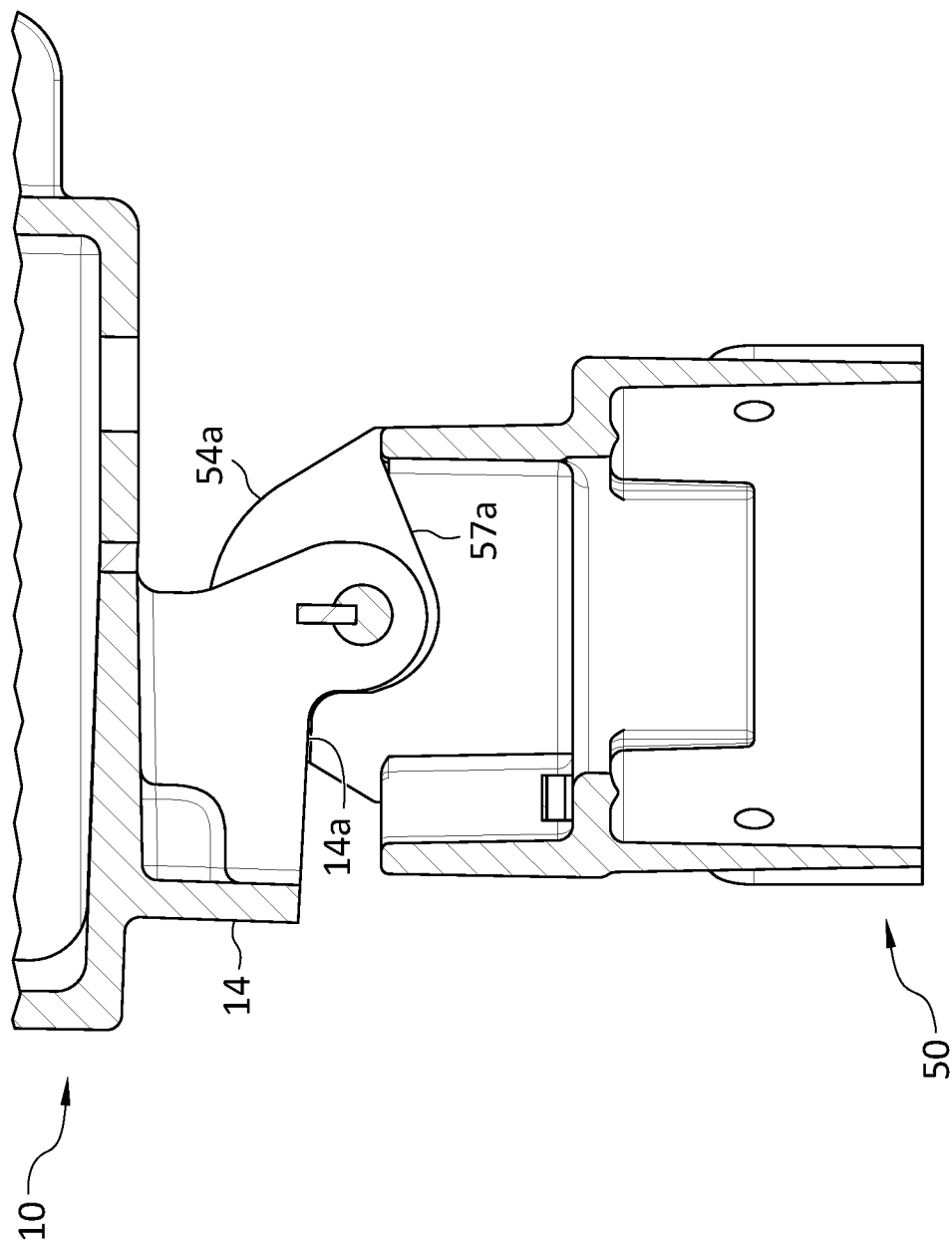
FIG. 12 is a section view taken along line 12-12 for FIG. 1 illustrating the light assembly in a zero angle position.

Referring to FIG. 12, the contoured ledges 57a, 57b (only ledge 57a is visible in FIG. 12) are contoured such that an edge portion 14a of the housing 14 rests on the ledges 57a, 57b when the light assembly 10 is at a zero angle position (as determined relative to reference plane 150). In this respect, the light assembly 10 can be physically prevented from rotating to angles less than 0 degrees. It is contemplated that the angle of the light assembly 10 can be adjusted in increments of 0.1 degrees using the angle adjuster 102.

As noted above, the washer 96 (FIG. 9) may be a lock washer. In this respect, the once the light assembly 10 is placed at the desired angle, the nut 94 (FIG. 9) may be tighten so that the washer 96 (FIG. 9) fixes the light assembly 10 at the desired angle.

Moreover, referring to FIG. 8, the worm gear 104 and the spur gear 82 are configured such that the weight of the light assembly 10 (FIG. 1) cannot cause the worm gear 104 to rotate. In this respect, once the light assembly 10 (FIG. 1) is placed at the desired angle, it is difficult for the light assembly 10 (FIG. 1) to cause the angle adjuster 102 to rotate, thereby keeping the light assembly 10 (FIG. 1) at the desired angle.

Figure 13:
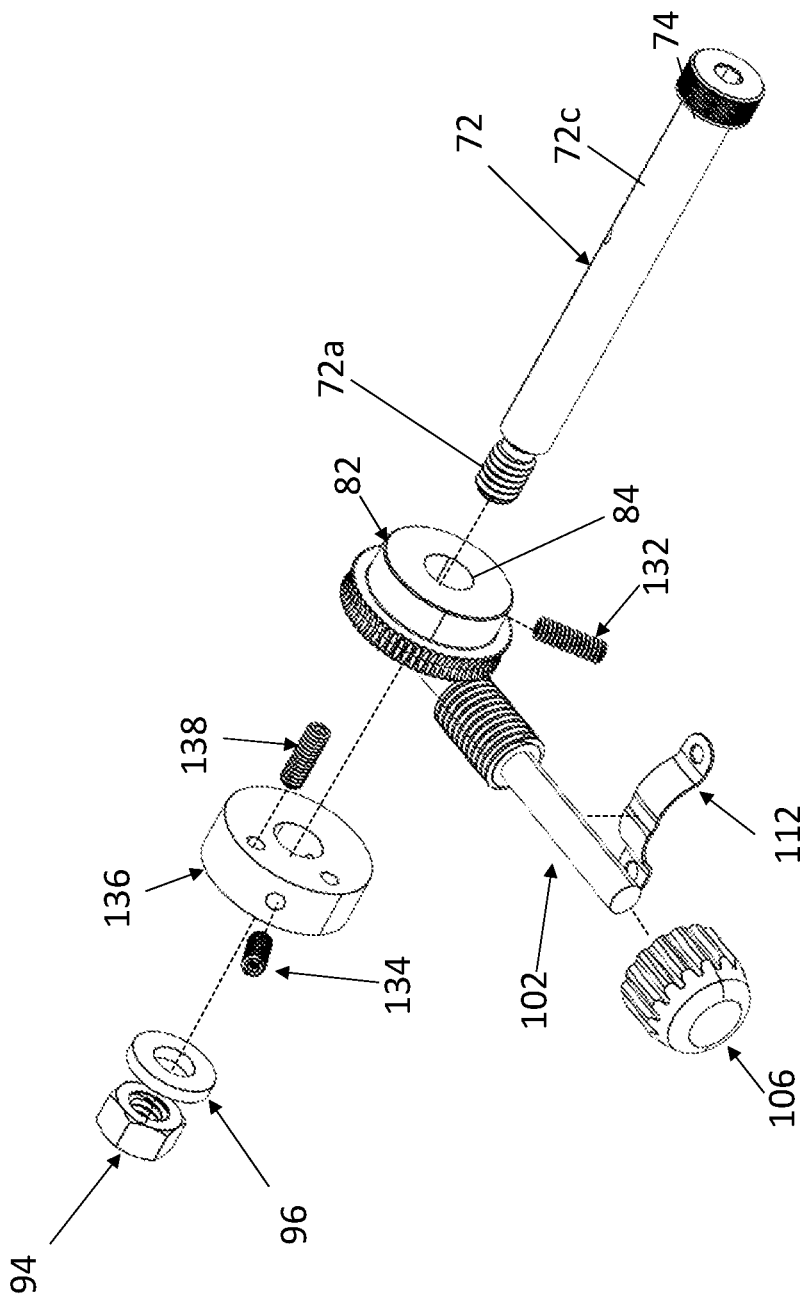
FIG. 13 is an exploded perspective view of various internal components of the angle aiming mechanism of FIG. 4, according to a second embodiment.
Figure 14:
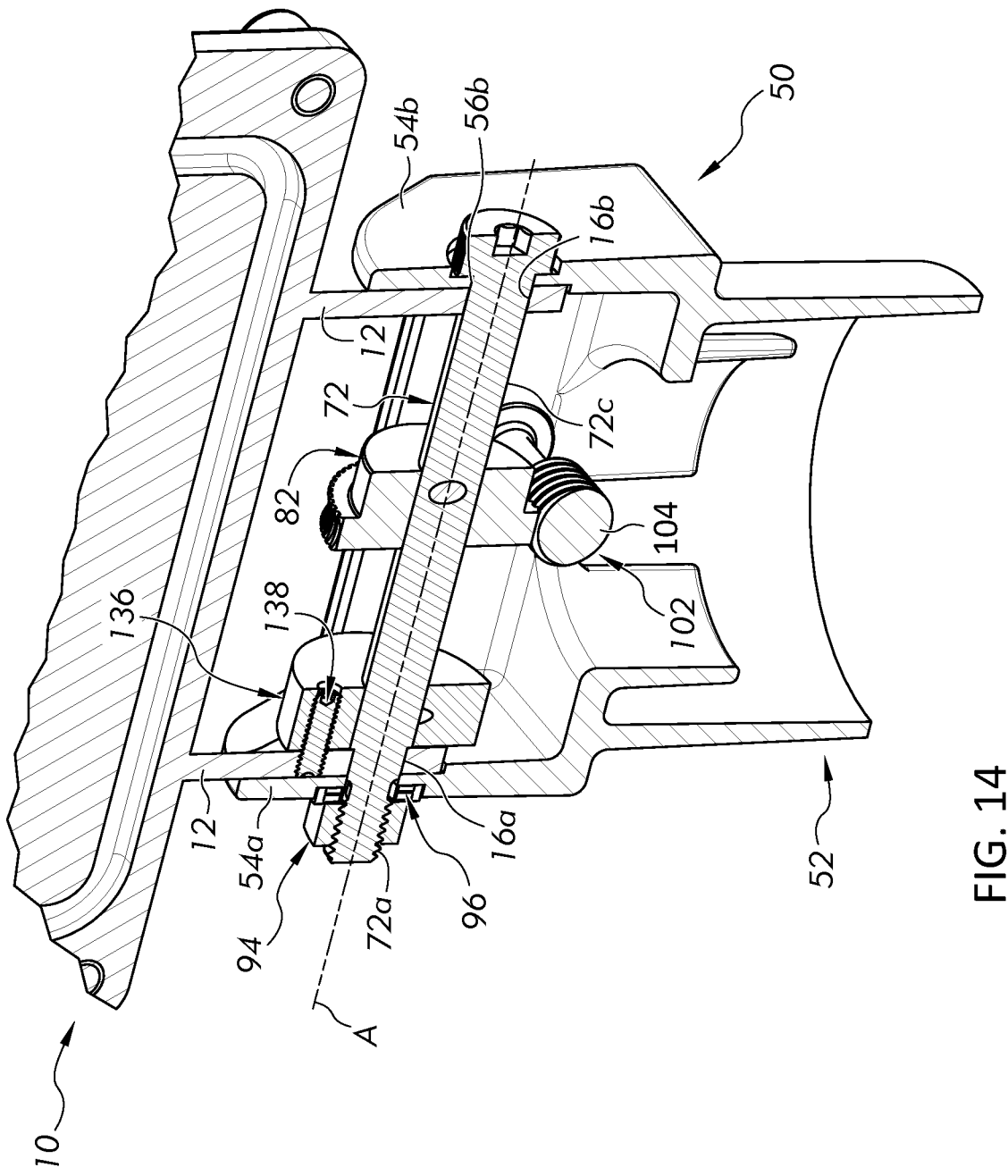
FIG. 14 is a section view taken along line 9-9 of FIG. 1 showing the various internal components according to the second embodiment of FIG. 13.

In the embodiment described above, the gear 82 is secured to the light assembly 10 via the key 92 (FIGS. 8 and 9). In a second embodiment, illustrated in FIGS. 13 and 14, a first set screw 132 extends through the gear 82 to secure the gear 82 to the main shaft 72. A second set screw 134 secures a hub 136 to another portion of the main shaft 72. One or more fasteners 138 are provided for securing the hub 136 to one of the mounting legs 12 of the light assembly 10. Similar to the embodiment described above, when the gear 82 engages the worm gear 104, rotation of the angle adjuster 102 causes the worm gear 104 to rotate which, in turn, causes the spur gear 82, the main shaft 72 and light assembly 10 to rotate or pivot. In FIGS. 13 and 14, components that are similar to the first embodiment are referenced using the same reference numbers. A detailed description of these components in not repeated herein for brevity.

In the embodiment described in detail above, a single screw 114 (FIG. 8) was provided for securing the spring 112 (FIG. 8) to housing 52 (FIG. 6). In the alternative embodiment illustrated in FIGS. 13 and 14, two screws (not shown) are provided for securing a spring 112 to the holes 64 (FIG. 7A) of the housing 52 (FIG. 7A).

Illustrative embodiments have been described, hereinabove. It should be appreciated that features of the embodiments described herein may be combined. Therefore, the inventive concept, in its broader aspects, is not limited to the specific details and representations shown and described. It will be apparent to those skilled in the art that the above apparatuses and methods may incorporate changes and modifications without departing from the scope of this disclosure. The invention is therefore not limited to particular details of the disclosed embodiments, but rather encompasses the spirit and the scope thereof as embodied in the appended claims.

What is claimed is:

1. An angle aiming mechanism for a light assembly, the angle aiming mechanism comprising:
   a body;
   a gear rotationally coupled to the light assembly; and
   an angle adjuster movable between a first position and a second position, wherein the angle adjuster engages the gear when the angle adjuster is in the first position, the angle adjuster disengages the gear when the angle adjuster is in the second position, and
   wherein rotation of the angle adjuster in the first position changes an angle of the light assembly relative to a reference plane.

2. The angle aiming mechanism according to claim 1, further comprising a spring for biasing the angle adjuster into the first position.

3. The angle aiming mechanism according to claim 2, wherein the spring is a curved spring or a flat spring.

4. The angle aiming mechanism according to claim 1, wherein the first position corresponds to the angle adjuster being in an upper position relative to the body and the second position corresponds to the angle adjuster being in a lower position relative to the body.

5. The angle aiming mechanism according to claim 1, wherein the gear is a spur gear and the angle adjuster includes a worm gear configured to engage the spur gear when the angle adjuster is in the first position.

6. The angle aiming mechanism according to claim 1, wherein a knob is attached to a distal end of the angle adjuster for allowing a user to rotate the angle adjuster.

7. The angle aiming mechanism according to claim 1, wherein a key rotationally couples the gear to the light assembly.

8. The angle aiming mechanism according to claim 1, wherein a first set screw rotationally couples the gear to a main shaft and a second set screw rotational couples the main shaft to a hub that is attached to the light assembly.

9. The angle aiming mechanism according to claim 1, further comprising a main shaft defining a rotational axis of the light assembly, the gear being attached to the main shaft.

10. The angle aiming mechanism according to claim 9, further comprising a nut on the main shaft for fixing the light assembly at the angle.

11. The angle aiming mechanism according to claim 9, wherein a longitudinal axis of the main shaft is orthogonal to a longitudinal axis of the angle adjuster.

12. The angle aiming mechanism according to claim 1, wherein the angle adjuster is configured to pivot relative to the body when moving between the first position and the second position.

13. The angle aiming mechanism according to claim 1, wherein a swivel bearing is attached to a distal end of the angle adjuster for allowing the angle adjuster to pivot between the first position and the second position.

14. The angle aiming mechanism according to claim 1, wherein the body includes a pair of spaced-apart supports.

15. The angle aiming mechanism according to claim 14, wherein an inner surface of the pair of spaced-apart supports is recessed to define a pair of contoured ledges.

16. The angle aiming mechanism according to claim 15, wherein the pair of contoured ledges define a pocket to receive a pair of spaced-apart mounting legs extending from the light assembly.

* * * * *